June 6, 1961  A. ELMENDORF  2,986,782
COMPOSITE SHEATHING
Filed Dec. 28, 1956
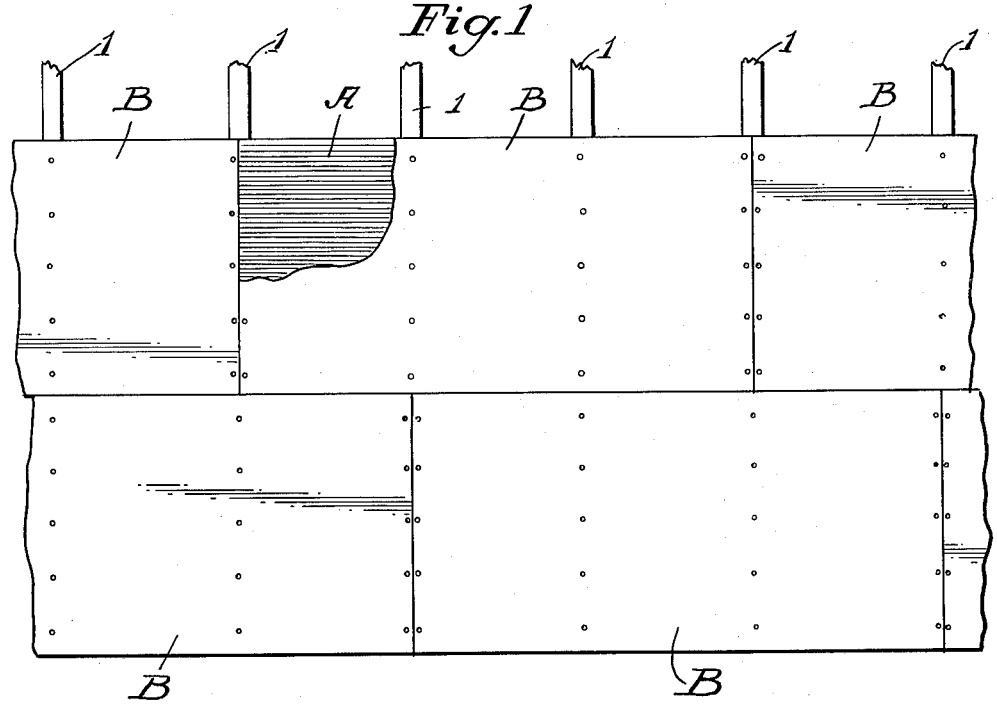
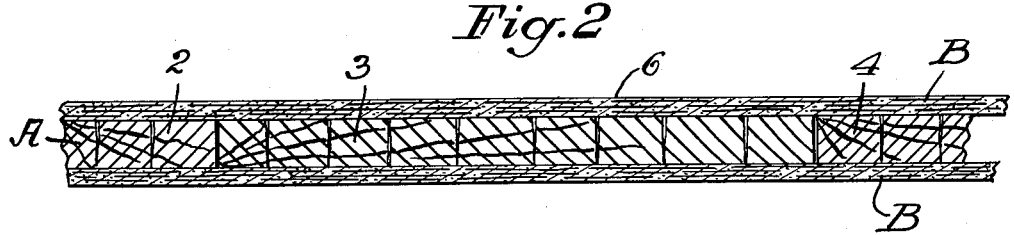
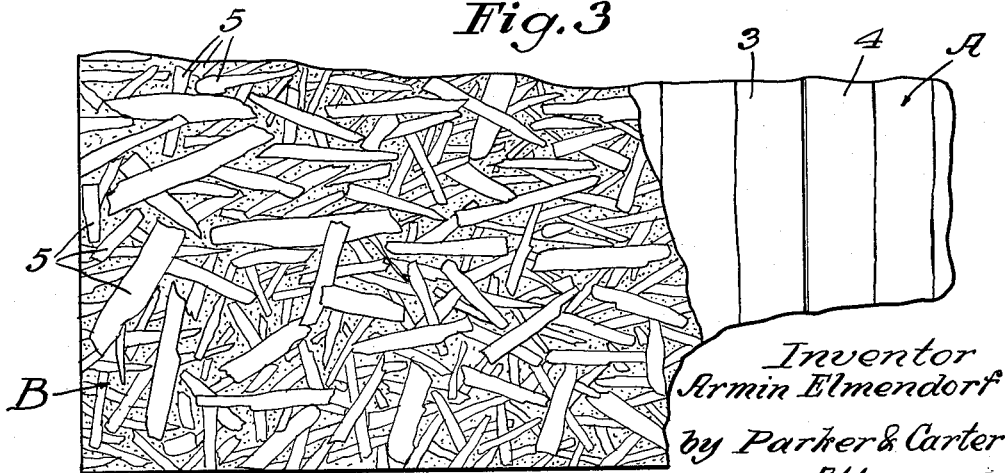
Inventor
Armin Elmendorf
by Parker & Carter
Attorneys

United States Patent Office 2,986,782
Patented June 6, 1961

2,986,782
COMPOSITE SHEATHING
Armin Elmendorf, 860 Charleston Road, Palo Alto, Calif.
Filed Dec. 28, 1956, Ser. No. 631,240
5 Claims. (Cl. 20—4)

My invention relates to an improvement in composite boards suitable for wall and roof sheathing and other uses, such as sub-flooring, which has marked advantages over the previously available materials.

The two most important materials now being used for sheathing and sub-flooring, which have long been standard materials of construction for these purposes, are lumber and plywood. Of these, lumber is the oldest, from the point of view of usage. It has maintained its dominant position in the building industry, notwithstanding its liabilities, on account of its strength, availability, ease of fitting on the job, nail-holding power, and relatively low cost. As a wall and roof sheathing material, lumber has some glaring defects associated with the use of the low grade material that must, of necessity, be used. It has many knots, and often contains knotholes, splits and other imperfections. It is available only in relatively narrow boards which are conventionally applied at right angles to the house framing, and, consequently, on account of their narrowness, contribute very little to the bracing of the structure. As a sub-flooring material to receive flexible floor coverings, such as linoleum, and asphalt or rubber tile, lumber is unsatisfactory because the boards often cup in place, thereby producing an uneven foundation for the floor covering. Shrinkage of the boards often ruptures the floor coverings.

Plywood, and, in particular, Douglas fir plywood, has, in recent years, been used for sheathing and sub-flooring on a rapidly increasing scale, notwithstanding its greater cost, because it overcomes most of the deficiencies of lumber. Plywood must, however, be made of veneer derived from relatively high grade, large and expensive logs, because the logs must lend themselves to peeling into veneer in a lathe, and this is only feasible with large and straight logs. Such logs are consequently highly select and expensive. If Douglas fir plywood is made exclusively of the low grade segments of so-called "peeler logs" it contains many knotholes, because the knots generally fall out of veneers derived from large, old-growth logs when the veneers are dried. To up-grade the veneers, by plugging the knotholes, further increases the cost of the plywood. The so-called "peeler logs" suitable for veneer cutting always cost more than the so-called "saw logs" suitable for conversion into lumber.

While plywood of appropriate thickness provides bracing and nail-holding power when used for wall and roof sheathing, and can be thinner than the lumber with which it competes, it still costs more than lumber. As a sub-flooring material, plywood of appropriate thickness provides adequate strength and stiffness, and when the knotholes are plugged it is superior to lumber for this use. Its dimensional stability is greatly superior to that of lumber across the grain.

The aim of my invention is to provide the advantage of plywood with the cost of low-grade lumber. In the production of my composite sheathing I can use the smallest and lowest grade logs brought out of the forest.

Many attempts have been made to produce composite boards for sheathing and sub-flooring use by converting saw mill residues, such as slabs and trim, as well as low grade or small logs not suitable for either the lathe or the saw into chips, particles or shavings, and then combining these under heat and pressure into wide boards of appropriate thickness. In order to keep down the cost and weight such boards may not exceed, in density, about 0.6. Boards of this density, made of chips or other wood particles bonded together, have a modulus of rupture of about 1,500 to 3,000 p.s.i. In contrast to this the modulus of rupture of lumber is generally over 10,000 p.s.i. in the direction of the grain. The stiffness of the composite boards is correspondingly low, so that, as sub-flooring, they bend more than lumber when walked on. As sub-flooring material the composite boards currently made are, therefore, not satisfactory.

Extensive attempts have been made to use so-called chip or particle boards for sheathing, but these have not been successful because such boards are deficient in dimensional stability. In the rain, or in periods of prolonged, high-atmospheric humidity, they expand and buckle, and thereby become unsatisfactory.

When particle boards are used in a horizontal position and are then loaded between supports, they yield or sag slowly. Natural wood when similarly loaded continues to hold the load without yielding. Slow yielding or sagging of subflooring under load is highly objectionable.

My invention has as one of its purposes to overcome deficiencies of the aforementioned chip, particle or shaving board, and to make it comparable to plywood in dimensional stability, stiffness and strength. By applying my sheathing with the grain of the natural wood core across the framing (studs, rafters, joists), I utilize the stiffness and dimensional stability of natural wood parallel to the grain, the core of the panel contributing to these properties across the framing, and the framing contributing to the properties across the core grain, assuming, of course, that the panel is well fastened to the framing, as by means of nails or other means of fastening. In such cases the framing members are either 16 inches or 24 inches on center, but may range from 12 inches to 48 inches apart.

Another purpose of the invention is to provide a method for making the board herein described.

Other purposes will appear from time to time in the course of the specification and claims.

I illustrate my invention more or less diagrammatically in the accompanying drawings wherein:

FIGURE 1 is a view of a wall, roof or floor structure with panels or units of my material in place on studding, rafters or floor joists.

FIGURE 2 is an across-the-grain section, on a somewhat enlarged scale, of material embodying my invention; and FIGURE 3 is a plan view of the structure of FIGURE 2, with part of an outer layer broken away.

Like parts are indicated by like symbols throughout the specification and drawings.

Referring to the drawings, and considering FIGURE 1 as a showing of a typical, partly finished floor, wall or roof, of house construction, I indicate any suitable framing members arranged in parallel and appropriately supported, and forming part of any building, not herein shown in detail. When my sheathing is applied to a wall the element 1 can be taken as the usual vertical studding. When it is applied to a roof it will be understood that the members 1 are rafters suitably supported in horizontal or inclined position. It will be understood, of course, that when my sheathing is used in wall, floor or roof structures it is covered, respectively, by any suitable outer covering. Thus, wall sheathing may be covered by wood siding, sub-flooring by any suitable floor covering, such as linoleum, and roof sheathing by shingles, roll-roofing, or other roof covering.

Considering, now, the characteristics of my composite sheathing, I employ a core of natural wood such as lumber or veneer. This core is indicated at A in FIGURES 2 and 3, and may be constituted by a series of individual wood members or planks, indicated at 2, 3 and 4, in FIGURE 2, each generally containing numerous knots and, sometimes, knotholes. Each of these planks or wood elements may be divided along the grain into a plurality of structurally separate elements, which, however, maintain their original relative position. Such division is generally not necessary with veneer cores but is desirable with cores of lumber ¼-inch or thicker. Division may be achieved, for example, by sawing, slitting, or shearing, the overall width across the elements being greater than the sum of the widths of the individual elements. The core thus formed carries at one or both sides an outer or surface layer B, consisting of lignocellulose shavings bonded to each other and to the core. In applying the surface layer or layers B to the natural wood core, the core is preferably adhesively coated, with the individual boards 2, 3 and 4 substantially abutting each other. To the adhesively coated core surface or surfaces the outer layer is applied as resin-coated shavings which are compacted and bonded together simultaneously with bonding to the wood core. In the final product the panel core layer may therefore consist of the narrow, parallel wood elements, structurally disconnected and arranged in groups, with the layer of lignocellulose shavings bonded together and bonded to the core. The shavings used in the present invention are randomly distributed. Preferably, each shaving has generally parallel surfaces, the botanic fibers of the shavings being parallel to the surfaces of the shavings, the faces of most of the shavings being substantially parallel to the faces of the wood core. These shavings are distinguishable from planer shavings in that most planer shavings do not have the fibers parallel to their surfaces. In separating the individual planks or natural wood units into narrow elements I find it advantageous to separate the elements into which the core has been divided by a space of the order of from 3% to 10% of their across-the-grain width.

According to another embodiment of the invention, a series of individual planks of wood may be assembled without subdivision, side by side and edge to edge with their respective grains running generally parallel to one another.

In another embodiment of the invention, the core may be made of a relatively thick sheet of wood veneer.

Preferably, the average length of the shavings or strands is ½ to 2 inches, the average width is 1/16 to ½-inch, and the average thickness is 5 to 20 one-thousandths of an inch. Shavings as used differ from ordinary wood particles in that they are cut with a knife, whereas particles resemble sawdust and result from the fracturing of wood elements, as by a saw or hammermill. Chips are large particles produced in a chipper or hog and are much thicker than the shavings of the present invention. Strands are narrow shavings in which the fibers of which the wood is composed are approximately parallel to the shaving surfaces.

In FIGURE 3 I have more or less diagrammatically illustrated the upper layer B as being formed of wood shavings, indicated at 5. These are randomly arranged and extend across as well as along the grain of the core elements into which the planks 2, 3 and 4 are divided.

I have found that for any given core and panel thickness the density of the faces of the composite panel must exceed the density of the wood core in order to obtain satisfactory strength and stiffness. The resin content in the faces should be on the order of 4% to 15% of the weight of the faces where urea resins or protein binders are used. Where phenol resins or melamine resins are used the resin content should be 2% to 10% of the weight of the faces. The density of the faces is preferably on the order of .6 to .95. Face densities which are so high as to cause crushing of the wood core in the compression stage of the manufacturing process should be avoided. For some soft wood cores (such as redwood or cedars) the face density should preferably not exceed .8 in order to avoid crushing of the core.

The lower limit of pressure employed in compressing the faces is that pressure which will compress the faces to a density of .6. No wood of any commercial importance that is suitable for the core of my board has a density greater than 0.6. The upper limit of pressure employed in compressing the faces will be that pressure which will compress the faces to a density of 0.95 without crushing the wood core. The upper limit of pressure used is thus defined by two factors, namely, a face density not exceeding .95 and that minimum pressure which will crush the core. The density of the core thus remains the same as it was before consolidation. The specific gravity of the product is preferably .5 to .7.

For high strength and low weight while retaining the advantage of low cost, the specific gravity of the product should be about .6. The face density must exceed that of the wood of which the faces are made, and preferably as high as possible (not exceeding .95) without crushing the wood core in the compression stage and without increasing the binder weight beyond that set forth. The binder may be sprayed on the shavings while these are stirred or it may be added as a powder. A higher moisture content is required in the shavings when using a powdered binder in order to obtain the steam necessary for softening the shavings so that they may be compressed. The moisture of the shavings should exceed 8% and the moisture of the core should preferably be less than that of the faces. As it takes some time to heat the core after the faces are heated to the curing temperature of the binder and since its moisture is below that of the faces, it does not compress whereas the faces do under the identical pressure.

In the manufacture of the product the steps may be widely varied, but the following steps, or their equivalents, may be employed: (1) A natural wood core is formed as in any one of the preceding embodiments; (2) A suitable adhesive is applied to the surface of the core; (3) The binder-coated shavings or strands for the lower layer B are assembled upon a caul; (4) The adhesive-coated core is placed upon a mat of strands or shavings so assembled, and a second mat of binder-coated strands or shavings is positioned upon the core; (5) The assembly so made is subjected to heat and pressure, thereby compressing and bonding the shavings of the surface layers together and simultaneously bonding the surface layers to the natural wood core without compressing the core.

It will be realized that whereas I have described and shown a practical and operative product and a practical method for manufacturing it, I wish my description and drawings to be taken as in a broad sense illustrative.

My composite sheathing herein described was developed to utilize sawmill and logging residues, logs unsatisfactory for sawing into boards, and small logs of the type commonly called "pulp wood" by the paper industry, as well as waste of the plywood industry. It consists, as above described, of a thin, natural wood core, which may be wedged or divided into narrow elements, and faces made of lignocellulose strands or shavings bonded together and to the core. The faces may be derived from sawmill, plywood or logging residues, but strands of bamboo, straw or other woody grasses may also be used. The sheathing herein described generally weighs very little more than Douglas fir plywood.

As the faces of my sheathing are fibrous, and free of knots and knotholes, the product lends itself not only to use as sheathing in house construction, but to many other uses, for which only the highest grade plywood can now be used. It will be understood, of course, that the thickness of my sheathing may be varied to suit the particular use. As wall sheathing, it competes with ⅜-inch plywood. As floor and roof sheathing it competes with ½-inch or ⅝-inch plywood. For wall and roofing sheathing, and for sub-flooring, it also competes with ordinary lumber. It is preferably applied as lumber sheathing is, to the house framing, with the core grain across the studding or the floor joists.

My composite sheathing is dimensionally more stable than so-called particle or chip boards. It is stronger than conventional particle, chip, and shaving boards, and can be used for roof and floor sheathing, uses not open to such boards, on account of their inadequate strength and tendency to sag under continuous stress.

My composite sheathing can be sawed and nailed with the same ease as natural lumber. However, in use, I find it advisable to supply it in panels of a dimension having a predetermined relation to customary wall studding or floor joist spacing, so that the panels may be nailed in position, as shown, for example, in FIGURE 1, without trim waste. As the framing members of most houses are either 16 inches or 24 inches apart the panel in the core grain direction should preferably have a length which is a multiple of the spacing, such as 48 inches or 96 inches. A size convenient for handling on the job, and which also provides bracing as sheathing, is 36 x 48 inches.

My composite sheathing, made as above described, withstands the 10-cycle test currently used in the plywood industry for testing the water resistance of the glue bond. My lowest cost sheathing may be made with a protein binder, which is satisfactory for many uses. It, as well as the resin-bonded sheathing, may be exposed to weather for prolonged periods while the house is under construction, and the sheathing is exposed to rain and sun.

The nail-holding power of my sheathing is comparable to that of Douglas fir plywood, and greatly superior to that of insulation board sheathing.

It will be understood that, for different purposes, I employ different thicknesses of sheathing and different thicknesses of core. For sheathing ½-inch thick the natural wood core may be of the order of ¼-inch in thickness. For a ⅝ inch thickness of sub-flooring the natural wood thickness may be of the order of ⅜ of an inch. I have found that to get the optimum results from the point of view of strength and stiffness per unit of cost the wood core should be thicker than the faces.

Knotty low-grade lumber may be used for the core. The core boards may be cut in a gang saw-dried, and then resawed to the desired ¼-inch, ⅜-inch, or other thickness. Slabs from the sawmill can be ripped into ⅜-inch lath, and these can be dried in bundles following conventional procedure. Such wood elements are also suitable for use in the core of the composite sheathing.

For the lowest cost of panel, ½-inch thick or thicker, the core wood is preferably sliced. Small logs are squared into cants as in cutting railroad ties, and these are then cut to 4-foot lengths. After soaking in hot water they are sliced into boards of the desired thickness, up to about ⅜-inch, on a slicing machine, thereby eliminating sawdust waste. This permits the use of logs of some species such as lodgepole pine, that are generally too small in diameter for sawing into lumber.

Solid sawmill residues such as slabs and trim can be used for conversion into strands, and, in this way practically the entire log may be used.

Stiffness, or resistance to bending, is probably the most important strength property desired in sub-flooring and sheathing. In order to excell in stiffness the composite lumber-strand sheathing of my invention must be made slightly thicker than the plywood which it displaces. Stiffness tests made on specimens 5 inches wide, tested on a 10-inch span, gave the following results. The load at the center of the beam when plotted against the deflection, provides the data from which the stiffness can be determined. It is measured by the load per ⅒-inch deflection. The core of my composite sheathing in the panels tested was made of lodgepole pine, a wood which is not quite as strong as the Douglas fir of which the competing plywood is made. The stiffness figures in the following table represent average values, with the core grain across and parallel to the supports. All specimens tested were of about the same density.

|  | Average stiffness lb./0.1 in. deflection |
|---|---|
| ⅜″ Douglas fir plywood (3-ply) | 94 |
| ½″ Lumber-strand sheathing (¼″ lodgepole pine core) | 100 |
| ½″ Douglas fir plywood (5-ply) | 215 |
| ⅝″ Lumber-strand sheathing (⅜″ lodgepole pine core) | 245 |

To obtain the maximum dimensional stability the thickness of the lumber core should exceed the thickness of the facing layers.

The stiffness and modulus of rupture of the present product are far superior to the stiffness and modulus of rupture of a composite board made of a natural wood core with sawdust facings and of the same thickness and density as the present product.

Open defects, such as small knotholes, are covered by the facing layers without revealing the presence of such defects, even though bonding of the shavings takes place over the empty spaces of the open defects, such as knotholes or splits. Veneer waste containing open defects may also be used for the core, and the core defects are not revealed through the faces, even though the faces are thinner than the core.

The temperatures used in consolidating the board may vary in accordance with the type of adhesive and binder used. It is only necessary to use that temperature which will set the adhesive and binder, and since such temperatures are well known to the art, they are not mentioned herein. Excessively high temperatures which mar the appearance of the panel or weaken the adhesive or binder should be avoided.

As a typical example of the product herein disclosed, a ⁵⁄₁₆ inch panel was made with a ³⁄₁₆ inch Douglas fir veneer core and redwood strand faces. The strands were randomly oriented and had an average length of 1¼ inches, average width of ¼ inch, and an average thickness of .012 inch. Urea resin binder was used, the weight of the binder being 7% (dry basis) of the weight of the strands. The assembly was subjected to hot plate pressure at a temperature of 320° F. The assembly was pressed at 150 pounds per square inch pressure to ⁵⁄₁₆ inch stops for 6 minutes. This resulted in a face density of 0.80 and an over-all density of 0.60. The density of the core remained about the same as before pressing, namely about .46. The resulting faces were each ¹⁄₁₆ inch thick.

A test specimen cut from the foregoing panel was prepared with a width of 3 inches and length of 7 inches. It was tested in cross-binding the weak way on a span of 6 inches with the core grain parallel to the supports. The modulus of rupture was 3,400 pounds per square inch.

Whereas I have shown and described operative forms of the invention, it should be understood that there are modifications to the invention which will fall within the scope and spirit thereof and which will be apparent to those skilled in the art. The scope of the invention, therefore, should be limited only by the scope of the hereinafter appended claims.

This application is a continuation in part of my copending application, Serial No. 567,170, filed February 23, 1956.

I claim:
1. A building structure including parallel wood framing members spaced 12 inches to 48 inches on center and sheathing units applied to said parallel wood framing members, said sheathing units each including a core layer of natural wood extending across the framing members, said core layer having at least one surface layer of lignocellulose shavings bonded to each other and to the core, the density of the surface layer exceeding the density of the wood core and being of the order of .6 to .95, the density of the core being the same as that of the natural wood of which it is composed, the core and such layer of shavings being mechanically fastened to the framing members.

2. The structure of claim 1, characterized in that the core is comprised of structurally disconnected parallel wood elements arranged in groups, the elements of each group being in the same position relative to each other that they occupied in the living tree.

3. The structure of claim 1, characterized in that the surface layer shavings are randomly disposed and have generally parallel surfaces, the botanic fibers of the shavings being generally parallel to faces of the shavings, the faces of the surface shavings being substantially parallel to the faces of the wood elements of the core.

4. The structure of claim 1, wherein the shavings have an average length of the order of ½ to 2 inches, an average width of the order of $\frac{1}{16}$ to ½ inch and an average thickness of the order of 5 to 20 one-thousandths of an inch.

5. The structure of claim 1, characterized in that the thickness of the core exceeds the thickness of the layer of lignocellulose shavings.

References Cited in the file of this patent
UNITED STATES PATENTS

| | | |
|---|---|---|
| 2,379,163 | Landon | June 26, 1945 |
| 2,419,614 | Welch | Apr. 29, 1947 |
| 2,569,831 | Ryall | Oct. 2, 1951 |
| 2,642,371 | Fahrni | June 16, 1953 |
| 2,717,420 | Roy | Sept. 13, 1955 |
| 2,835,622 | Clark | May 20, 1958 |
| 2,853,413 | Christian | Sept. 23, 1958 |